July 15, 1958 R. G. BRENT 2,843,091
CHATTER-PREVENTING LINKAGE
Filed July 19, 1955 2 Sheets-Sheet 1

INVENTOR.
Robert G. Brent
BY
Attorneys

July 15, 1958 R. G. BRENT 2,843,091
CHATTER-PREVENTING LINKAGE
Filed July 19, 1955 2 Sheets-Sheet 2
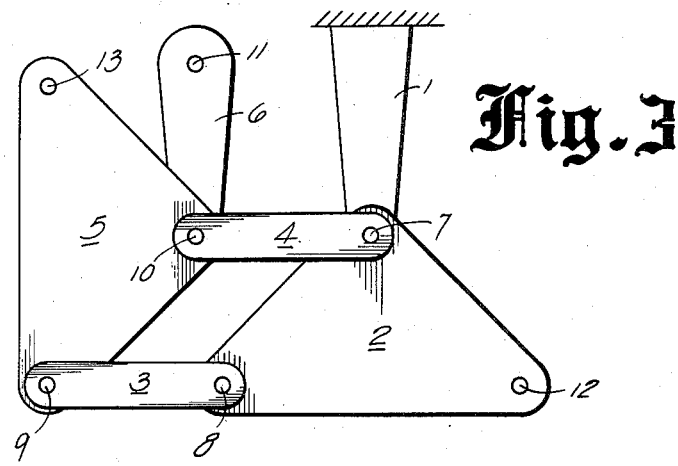
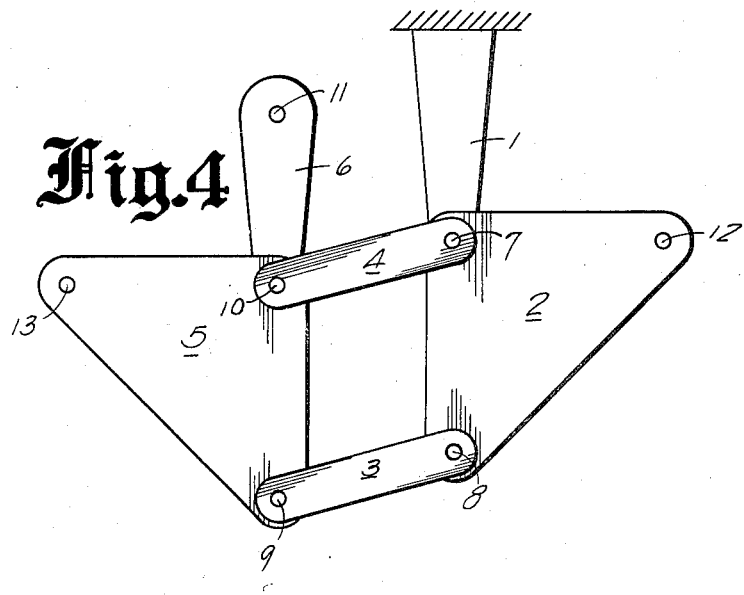
INVENTOR.
Robert G. Brent United States Patent Office 2,843,091
Patented July 15, 1958

2,843,091

CHATTER-PREVENTING LINKAGE

Robert G. Brent, Arlington, Tex., assignor, by mesne assignments, to the United States of America as represented by the Secretary of the Navy Application July 19, 1955, Serial No. 523,135

1 Claim. (Cl. 121—38)

This invention relates to improvements in flight control systems and is intended to provide a pilot's control system wherein a more accurate control is obtained by the elimination of chatter and aircraft deflection feedback.

In normal helicopter flight control systems employing hydraulic controls, one of the problems encountered is the creation of chatter in the system due to the reaction of the airplane back to the systems.

Another problem encountered in such systems is the effect of the vibrating plane on the hydraulic systems causing slight readjustments of the control system thereby causing the pilot to be on a constant alert to compensate for such readjustments. With such readjustments constantly being made, the pilot, in a sense, is not the sole factor in the absolute positioning of the various hydraulic controls.

It is an object, therefore, of this invention to eliminate control chatter in a flight control system.

Another object of this invention is the elimination of feedback into the control system arising from structural deflections of the aircraft.

Still another object of this invention is a flight control linkage system which permits the pilot to be the sole factor in adjusting the controls by the compensation of various outside influences on the control system.

Other objects and advantages will be apparent from the specification and claim, and from the accompanying drawings which illustrate an embodiment of the invention.

In the drawings:

Figure 3 depicts the position of the linkage assembly in a second possible position of the pilot's control lever, and Figure 4 shows the effect on the system of deflections in the aircraft.

Figure 1:
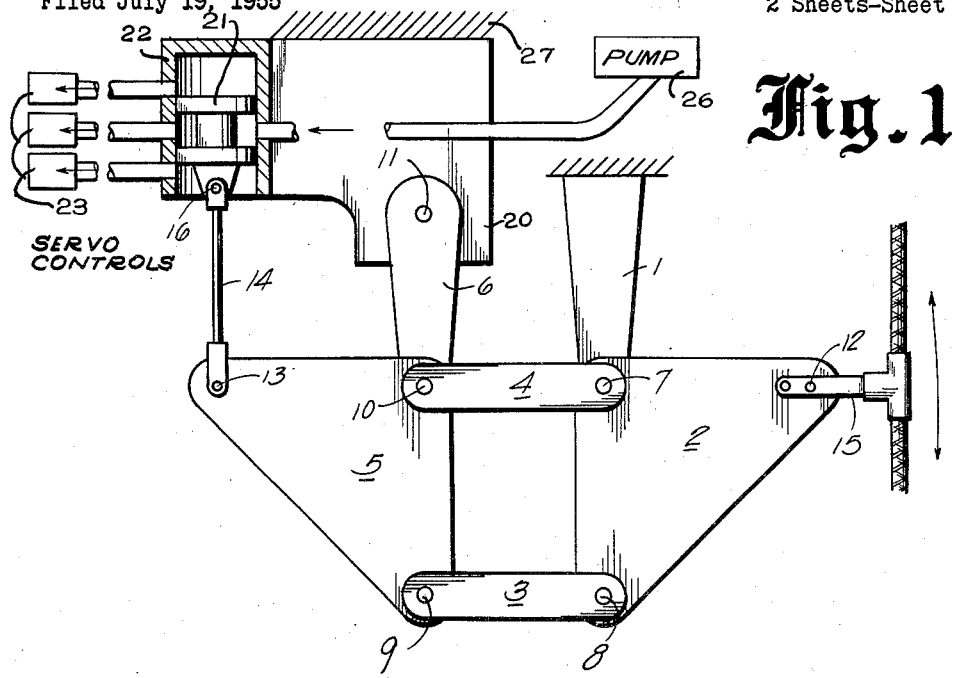
Figure 1 illustrates the control linkage in the normal or central position.

Referring to Figure 1, bracket 1 is fixed at one extremity to the aircraft housing; at the other extremity bell-crank lever 2 is pivoted at 7. Attached to lever 2 at pivot point 12 is the pilot's direct control cable 15. The cable leads directly to either the pilot's stick or control wheel.

Also pivoted from point 7 is a horizontal link 4; a similar link 3 is pivoted at one of its ends at point 8 at the lower end of the bell-crank 2. Levers 3 and 4 are also pivoted at points 9 and 10, respectively, from a second bell-crank lever 5.

A valve V is coupled to the control linkage via links 6 and 14. Link 6 is pivoted to the valve housing at point 11 and to the bell-crank at pivot 10, vehicle link 14 connects the valve body with the bell-crank at pivots 13 and 16.

Valve V is of conventional design and controls the servo fluid to the servo motors, 23, from the pump source, 26, which servos in turn actuate the surfaces or other means to be controlled. Valve housing or cylinder 22, containing the valve body 21, is shown as being attached to bracket 20 with the bracket and housing mounted to the aircraft structure 27. For illustrative purposes, bracket 20 is shown to be quite large, however, it may be of any size and may consist merely of a protuberance on the housing.

Figure 2:
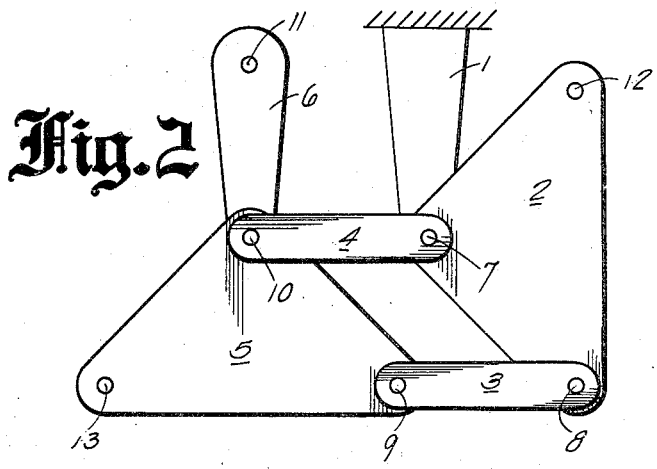
Figure 2 shows the position of the linkage in one position of the pilot's control lever.

Figure 2 illustrates a first possible position of the linkage. The linkage 15 from the pilot's control station has been actuated to rotate bell-crank 2 about pivot 7. Link 4 remains stationary while link 3 travels in a path parallel to link 4 thereby rotating bell-crank 5 about pivot 10. The bell-crank 5 actuates linkage 14 which in turn moves the shuttle valve. The valve, of course, then controls the fluid to the servo. In this figure, bell-crank 2 is rotated counter-clockwise and it is seen that bell-crank 5 is also rotated counter-clockwise. In Figure 3, it is seen that when lever 2 is rotated clockwise, bell crank 5 is also rotated clockwise and a reverse action from Figure 2 is obtained.

Although Figures 2 and 3 show a particular type of valve, it is obvious that other types may be substituted for such valve depending upon the actual control desired or upon the equipment available. It is also evident that either a closing or opening action of the valve may be obtained on the upstroke of the end of the bell-crank, while the reverse valve action would be obtained on the reverse stroke of link 14.

The operation of the decoupling linkage upon deflections, feedback or chatter of the aircraft upon the control system is as follows. As viewed in Figure 4, assume that a deflection, feedback or chatter has occurred thus causing link 6 to be forced downward. At the same time, the pins at pivots 9 and 10 will be forced downward causing bell-crank 5 to be moved downward an equal amount and with it the valve body. Consequently the setting of the valve will remain unchanged.

In the same action, links 3 and 4 are pivoted about pivots 7 and 8 and the bell-crank 2 is left stationary. Thus, no reaction is felt back to the pilot's lever or to lever 15.

In actual test operations a load of 300 lbs. was oscillated against the cylinder attached to bracket 6 at an amplitude of 3/16 in. and a frequency of 1 C. P. S. There was no evidence of valve chatter or skitter and also the absolute absence of fuel in the stick.

Obviously many modifications and variations of the present invention are possible in the light of the above teachings. It is therefore to be understood that within the scope of the appended claim the invention may be practiced otherwise than as specifically described.

What is claimed is:

A helicopter control system comprising, a bell-crank lever one end of which is an input station, means to pivotally anchor the apex of the bell-crank, a second bell-crank lever, a valve body surrounded by a valve housing, means to connect one end of said second bell-crank to the valve body, means to connect the apex of said second bell-crank to the valve housing, means to pivotally connect the free ends of the two bell-cranks, and means to pivotally interconnect the apexes of said bell-cranks.

References Cited in the file of this patent
UNITED STATES PATENTS

| 1,206,707 | Hunter | Nov. 28, 1916 |
| 1,216,204 | Brooks | Feb. 13, 1917 |
| 2,380,705 | Proctor | July 31, 1945 |
| 2,738,772 | Richter | Mar. 20, 1956 |